United States Patent
Blot et al.

(10) Patent No.: US 9,545,780 B2
(45) Date of Patent: Jan. 17, 2017

(54) METHOD FOR PRODUCING AN EXTRUDED STIFFENED PANEL, AND DEVICE FOR IMPLEMENTING SAME

(71) Applicant: Airbus Operations (SAS), Toulouse (FR)

(72) Inventors: Philippe Blot, Nantes (FR); Matthieu Kneveller, Les Sorinieres (FR)

(73) Assignee: Airbus Operations (SAS), Toulouse (FR)

( * ) Notice: Subject to any disclaimer, the term of this patent is extended or adjusted under 35 U.S.C. 154(b) by 421 days.

(21) Appl. No.: 14/351,250

(22) PCT Filed: Oct. 11, 2012

(86) PCT No.: PCT/EP2012/070168
§ 371 (c)(1),
(2) Date: Apr. 11, 2014

(87) PCT Pub. No.: WO2013/053831
PCT Pub. Date: Apr. 18, 2013

(65) Prior Publication Data
US 2014/0251529 A1    Sep. 11, 2014

(30) Foreign Application Priority Data
Oct. 11, 2011    (FR) .................................... 11 59179

(51) Int. Cl.
*B32B 38/00* (2006.01)
*B29C 70/46* (2006.01)
(Continued)

(52) U.S. Cl.
CPC ......... *B32B 38/0012* (2013.01); *B29C 33/505* (2013.01); *B29C 70/462* (2013.01);
(Continued)

(58) Field of Classification Search
CPC ........ B29C 70/462; B29C 70/50; B32B 38/00; B32B 38/0012; B29D 99/00; B29D 99/0014
See application file for complete search history.

(56) References Cited

U.S. PATENT DOCUMENTS

| 3,490,973 A | 1/1970 | Graeff et al. |
| 5,897,818 A * | 4/1999 | Lewit .................. B29C 44/1209 |
| | | 264/258 |

(Continued)

FOREIGN PATENT DOCUMENTS

| EP | 2119544 | 11/2009 |
| WO | 2008019894 | 2/2008 |

(Continued)

OTHER PUBLICATIONS

International Search Report, Jan. 25, 2013.

*Primary Examiner* — Daniel McNally
(74) *Attorney, Agent, or Firm* — Greer, Burns & Crain, Ltd.

(57) ABSTRACT

A method for producing a part made of a composite material, including a skin and at least one stiffener made of strips, which are in turn made of one or more plies of fibers impregnated with a non-polymerized resin. The method includes the steps of: producing a preform of the part by pulling the strips through a die for shaping and positioning the skin and the stiffeners, a polymerization core being provided between a first strip and a second strip prior to the passage thereof through the die; and pressing the resulting preform in a hot press for a duration dt while applying a pressure P and at a temperature T for polymerizing the resin of the strips in the hot press over a pressing length L that is shorter than the length of the panel.

9 Claims, 4 Drawing Sheets

(51) Int. Cl.
   *B29C 70/50*  (2006.01)
   *B29D 99/00*  (2010.01)
   *B29C 33/50*  (2006.01)

(52) U.S. Cl.
   CPC .......... *B29C 70/50* (2013.01); *B29D 99/0014* (2013.01); *Y10T 156/1002* (2015.01); *Y10T 156/14* (2015.01)

(56) References Cited

U.S. PATENT DOCUMENTS

| | | |
|---|---|---|
| 2007/0175571 A1* | 8/2007 | Rubin .................. B29C 70/525 156/196 |
| 2009/0206515 A1 | 8/2009 | Jansen et al. |
| 2010/0015405 A1 | 1/2010 | Bechtold et al. |
| 2010/0080952 A1 | 4/2010 | Suzuki et al. |
| 2010/0279076 A1 | 11/2010 | Kim |
| 2012/0148802 A1 | 6/2012 | Bechtold et al. |

FOREIGN PATENT DOCUMENTS

| | | |
|---|---|---|
| WO | 2008105636 | 9/2008 |
| WO | 2008116560 | 10/2008 |

\* cited by examiner

METHOD FOR PRODUCING AN EXTRUDED STIFFENED PANEL, AND DEVICE FOR IMPLEMENTING SAME

CROSS-REFERENCES TO RELATED APPLICATIONS

This application claims the benefit of the French patent application No. 1159179 filed on Oct. 11, 2011, the entire disclosures of which are incorporated herein by way of reference.

BACKGROUND OF THE INVENTION

The present invention belongs to the field of the production of structures.

More particularly, the invention relates to the production of thin and stiffened panels made of composite material.

In the field of structures, and more particularly of aeronautical structures, the use of structures that are strong and as light as possible is appreciated.

In particular, the structures such as airplane fuselages, or the shell structures in general, are constructed, among other things, from panels in which a skin that is relatively thin compared to the other dimensions of the panel is stabilized by stiffeners (also called stringers) fixed to the skin which increases the strength of the skin and above all which increases its rigidity and gives it an acceptable resistance to buckling.

Such stiffened panels can be made of metallic materials or, as is becoming more generally commonplace, in particular in the aeronautical field, of composite materials.

The type of composite materials used for these applications generally consists of a stack of plies comprising fibers, often long fibers, held in a hard organic matrix.

The fibers are oriented in directions that can be different according to the ply concerned in order to confer on each part made of composite material mechanical properties suited to the directions of the forces introduced into the part.

The parts made of composite material are shaped, to obtain the geometry that the parts need to have in the planned application, in a step during which the organic matrix, generally an organic polymer resin, is not hard, either the resin is a resin that hardens in a subsequent baking process, so-called thermosetting resins, or the resin is a resin in a plastic state when the temperature is raised to a sufficient value, so-called thermoplastic resins.

To produce a stiffened panel made of composite material, in particular of thermosetting composite material, it is necessary for the stiffeners to be strongly attached to the skin of the panel, and, for this, there are a number of techniques which are implemented these days.

A first technique consists in independently producing the skin and each of the stiffeners made of composite material and in joining the stiffeners to the skin in a hard state. The joining is then done by means that are also used with metallic materials such as bonding or riveting.

A drawback with this first technique lies in the fact that it is lengthy to implement and that each of the elements to be joined has to be produced with sufficient accuracy to ensure that the joining will be correct. In practice, to achieve the necessary accuracy, said accuracy demands the use of molds which are both costly and specific to each part to be produced.

A second known technique consists in producing the stiffeners made of composite material in a first step and then, in a second step, producing the skin made of composite material directly on the prepositioned stiffeners, and finally, in a third step, proceeding with the hardening of the skin at the same time as said skin adheres to the stiffeners.

This technique makes it possible to guarantee that the skin will be applied very accurately to the stiffeners, but it requires the stiffeners to be perfectly held in position in a mold during the production of the skin and it is difficult in this case to obtain the accuracy and the surface finish expected of the finished panels.

In a variant of this technique, the skin is produced first and the stiffeners are produced on the skin in a second step, but, while in this case it is generally easier to obtain the surface finish sought on the face of the panel opposite that to which the stiffeners are fixed, it is more difficult on the other hand to obtain a satisfactory accuracy in the positioning of the stiffeners.

This second technique and its variant further require the interposition of a film of glue at the skin/stiffeners interface and therefore an additional step in the production of the panels.

A third technique consists in simultaneously molding the skin and the stiffeners in a non-hardened state and in carrying out the simultaneous hardening of the skin and of the stiffeners during a baking step during which the stiffeners are joined to the skin in a phase of polymerization of the resin.

This technique, called cocuring, allows for a very efficient joining of the stiffeners and of the skin but is demanding in terms of molds which have to be of dimensions similar to the panel to be produced and it has proven difficult to control the dimensions of the part when the tolerances to be observed are tight.

SUMMARY OF THE INVENTION

The method of the invention proposes a method which makes it possible to mitigate the main defects of the existing techniques for producing parts made of thermosetting composite materials; these composite materials, in the finished state, comprise plies of fibers which are held in a hardened resin, more often than not a polymerized organic resin.

The parts produced by the method according to the invention are, for example, stiffened panels.

A part produced according to the method of the present invention comprises two subassemblies: a skin and at least one stiffener, generally a plurality of stiffeners. The skin and the at least stiffener are securely attached to one another. According to the invention, each subassembly is formed from at least one strip.

Thus, the skin is formed from at least one first strip and each stiffener is formed from at least one second strip. When the skin, or the stiffener, is formed from a plurality of strips, said strips are then superposed.

The dimensions of the first and second strips are matched to the dimensions of the skin and of the stiffeners and are generally different and designed such that a plurality of stiffeners can be joined to the skin.

Each of the first or second strips is formed by at least one ply of fibers impregnated with resin, the resin then being non-hardened; that is to say non-polymerized.

The method of the invention for producing a part made of composite material, a part comprising at least two subassemblies, namely a skin and at least one stiffener, generally a plurality of stiffeners, which are joined in the part produced, comprises:

a step of production of a preform of the part by pulling the first and second strips in a longitudinal direction X, each strip being formed by at least one ply, more often than not a stack of plies, of fibers impregnated with the resin in a non-hardened state, through a die for shaping and positioning the strips, at least one first strip being placed in contact with at least one second strip, and, in addition, a polymerization core being introduced between a first strip and a second strip in contact before their passage through the die and, in a subsequent step when the preform has left the die, a step of pressing of the preform obtained in a heating press for a duration dt so as to form the skin and the at least one stiffener joined to the skin, a pressure P and a temperature T for polymerizing the resin of the first and second strips being applied to the preform in the heating press over a press length L of the preform, this press length L being considered in the longitudinal direction X and being shorter, preferably small, compared to a length of the panel produced, when said preform has left the die under the effect of the pulling.

Thus, when the strips pass into the dies, they are shaped according to the geometry of the dies which is in accordance with the geometry of the part and of its subassemblies, on the one hand the skin and on the other hand the stiffener or stiffeners, and the duly shaped subassemblies are positioned accurately relative to one another with their surfaces that have to be joined in contact. Finally, as they are removed from the die, the strips forming the part are compacted and hardened by polymerization.

Furthermore, the core is introduced continuously during the formation of the preform.

To produce a part of long length, the pressure P of the hardening step is produced cyclically when a predefined preform length dL has left the die under the effect of the pulling. The duration of a cycle therefore corresponds to the duration necessary for a length dL, shorter than the press length L, of preform to leave the die and of part to leave the press in the desired polymerized state. It is thus possible, at least theoretically, to produce a part, whose section corresponds to the section of the die, of infinite length, in practice limited by the length of the strips used to produce the part.

To ensure a desired hardening of the resin, the hardening step is applied, in a cycle, for a duration dt determined such that a given point of the preform has been subjected to the pressure P and to the temperature T for a cumulative time necessary to obtain a desired level of polymerization of the thermosetting resin when said point has traveled, from its leaving the die, a distance corresponding to the press length L. The desired hardening may correspond to a final polymerization of the part or else a partial polymerization of the resin if, for example, subsequent forming steps are provided. The polymerization is thus gradual over the press length L for a given point of the preform which passes from the non-polymerized state in the first cycle for which this point is subjected to the pressure P and to the temperature T to the required polymerization state in the last cycle having caused it to travel the press length L.

According to one method, for moving the preform along, the pressure P is interrupted at the end of a cycle of the polymerization step when the preform is moved by a length dL under the effect of the pulling and the preform is immobilized during the application of the pressure P.

According to another method, the pressure P is applied during the movement of the preform, which, in this case, is followed, even driven, by the device which applies the pressure P and the temperature T, under the effect of the pulling and is interrupted at the end of a cycle of the polymerization step when the preform has been moved by the length dL to carry out the next cycle.

In all cases, it will be appreciated that the moving the preform by a length dL is associated with, downstream, according to the direction of pulling, the production of an equal additional length of part and, upstream, the entry of the same length of strips into the die and the creation of the same length of preform at the exit of the die.

In order to ensure that the part has at all points reached the desired level of polymerization, the length dL is strictly shorter than the press length L, and, for preference, to allow a substantially continuous manufacturing process and even polymerization in the lengthwise direction of the part, is equal to or less than ⅓ of the press length L.

In one embodiment, the polymerization core is an inflatable core, for example taking the form of a bladder that can be introduced in an uninflated flattened form into the entry of the die where they behave like a strip.

The polymerization core is advantageously inflated after it has passed into the die to a pressure Pa higher than the atmospheric pressure assumed to prevail in the workshop in which the method is implemented.

Advantageously, the internal pressure inside the inflatable polymerization core is kept at a level significantly higher than the ambient atmospheric pressure when the pressure P of the heating press is applied, so as to prevent the strips from becoming separated or deformed by the inflatable polymerization core.

In order to limit the risks of the strips tearing as the preform is being pulled, particularly when the strips are in the die, each strip comprises at least one ply comprising long fibers oriented in the longitudinal direction X corresponding to the direction of pulling when the strip is incorporated into the preform. Thus, if a strip comprises just one ply, this ply comprises long fibers oriented in the lengthwise direction of the strip and if a strip is formed of a stack of plies, then at least one of these plies comprises fibers oriented in the lengthwise direction of the strip.

When reinforcements are to be produced locally on the part, advantageously, prior to the production of the preform, upstream of the die, one or more reinforcing plies or strips are deposited locally on at least one of the strips during a previous step so that the local reinforcements are incorporated into the method of manufacture and cocured with the part without the need to produce the local reinforcements in a subsequent step.

In order to compact the composite material of the stiffeners during the hardening step, lateral compression is advantageously applied to the web of the stiffeners.

In another implementation of the method, the parameters affecting the polymerization of the thermosetting resin, notably the temperature T, the press length L, the length dL of travel during a cycle and the duration dt of a cycle, are determined in such a way as to obtain, after the polymerization step, a part in the so-called part-cured state, in which the resin is partially polymerized so as to allow subsequent hot-forming of the part and/or assembly with other parts by cocuring during a final polymerization step.

The invention also relates to a device for producing parts made of composite material according to the method of the invention, which device comprises a die for shaping and positioning first and second strips, these strips being formed of plies of fibers impregnated with a non-hardened resin, introduced upstream of the die to produce a preform downstream of the die, in a direction X of travel of the part that is to be produced, and which comprises a heating press for applying a pressure P for compacting the plies of the preform and for applying a temperature T for heating the preform to a temperature at which the resin polymerizes.

Furthermore, in the device of the invention, the heating press is placed downstream of the die and a pulling device acts on the part formed and or on the preform to move the strips through the die in the direction from upstream to downstream.

The device also comprises a device for dispensing at least one polymerization core, configured to dispense each polymerization core between a first strip and a second strip upstream of the die.

In one embodiment for implementing the method in the case where inflatable polymerization cores are used, the device comprises a system for inflating the inflatable bladder or bladders of the polymerization cores, which inflation system is preferably slaved to the heating press so that the inflatable bladder or bladders are inflated only if the pressure P is being applied to the preform by the heating press.

The heating press applies the pressure P cyclically in a way that is coordinated with the movement of the preform under the action of the pulling device so as to allow the part to move along and so as to progressively polymerize the resin.

To shape the various subassemblies, the die comprises secondary dies, one secondary die corresponding to one subassembly, skin or stiffener, of the part to be produced using the device.

The die if appropriate comprises a profile to form a plunged groove along one edge of the panel or along each edge of the panel, this/these plunged groove(s) allowing the panels to be flush lock seam jointed.

Advantageously, to achieve strips of long lengths and be able to produce the part continuously likewise over long lengths, the part produced if necessary being cut into panels of shorter lengths after it has passed through the heating press, the strips are prepared in reels and the device comprises a rack to hold the reels of strip upstream of the die.

When stiffeners require the use of a polymerization core, the device is provided with a device for dispensing flexible inflatable bladders, at least one bladder per stiffener concerned. The bladder, in a flattened non-inflated form, is introduced into the die in such a way as to be positioned in a hollow zone that is to be filled by the polymerization core once the core has been inflated.

Like the strips, the uninflated bladders are advantageously prepared in reels placed on a rack of the device.

To move the part along, the pulling device is a device with rollers and/or with tracks and/or with translation of the heating press, it being possible where appropriate for these various means to be used in combination and to pull on the part produced downstream of the heating press and/or on the preform.

In one embodiment of the device, at least one plate of the heating press comprises an elastically deformable element, such as a block of elastomer or an inflatable membrane or even a plate mounted on spring elements, in an area of application of the pressure P to the preform. In this way, satisfactory application of pressure and satisfactory shaping are achieved even when the part has local thicknesses of its subassemblies that may vary along their length in the direction X.

In one particularly advantageous embodiment, the device is configured for the production of self-stiffened panels in composite material comprising a skin and at least one stiffener attached to the skin.

BRIEF DESCRIPTION OF THE DRAWINGS

The detailed description of one embodiment of the invention is given with reference to the figures which schematically illustrate.

DETAILED DESCRIPTION OF THE PREFERRED EMBODIMENTS

The method of the invention uses a principle of extruding of strips comprising plies of fibers previously impregnated with a non-hardened resin, so-called fresh prepregs for the continuous production of stiffened panels.

The fresh state is generally the state in which the various plies used to form a part made of composite material, in the invention for producing the strips, are applied in successive layers. The fibers of each ply are impregnated with a resin that is polymerizable at a preliminary stage.

In this particular instance, the plies considered comprise long fibers oriented in defined directions, preferably so-called unidirectional plies, i.e., plies in which all the fibers of a given ply have the same orientation.

Figures 1A, 1B:
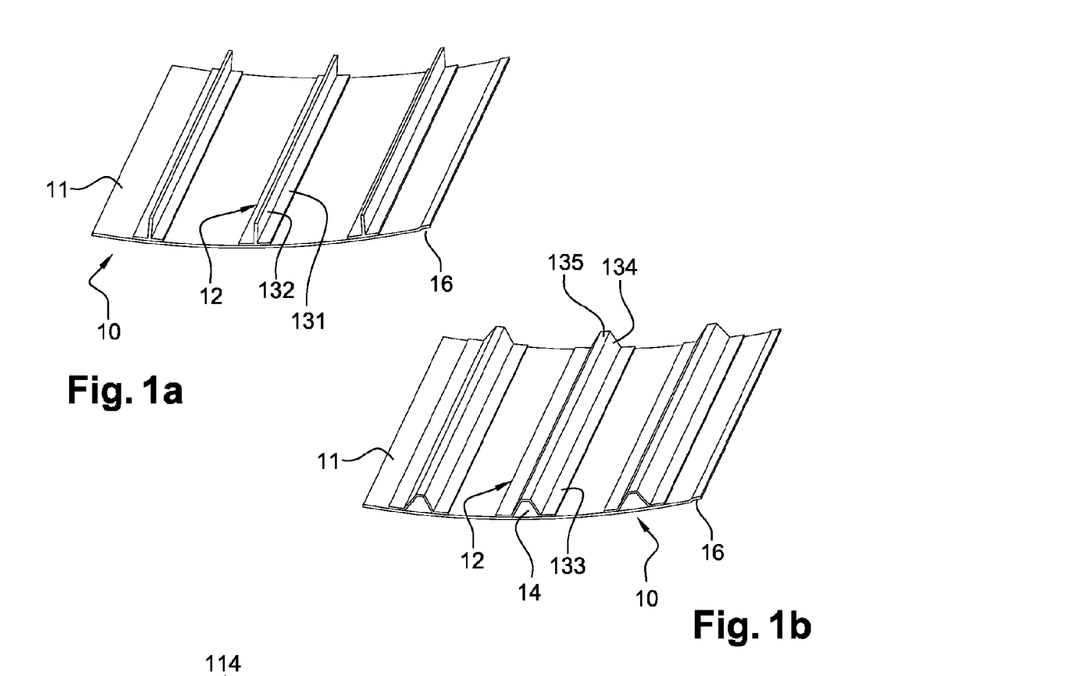
FIG. 1a: one example of a stiffened panel made of composite material comprising open stiffeners.
FIG. 1b: one example of a stiffened panel made of composite material comprising closed stiffeners.

FIGS. 1a and 1b illustrate two examples of stiffened panels 10 comprising a skin 11 on at least one face of which stiffeners 12 are fixed.

In the case of the panel of FIG. 1a, the stiffeners 12 are T-shaped stiffeners, fixed to the skin at a sole 131, corresponding to the horizontal bar of the T, and comprising a web 132, corresponding to the vertical bar of the T, locally substantially perpendicular to the skin 11.

In the case of the panel of FIG. 1b, the stiffeners 12 are omega Ω shaped stiffeners fixed to the skin at two soles 133 which are connected by two webs 134 and a head 135. The Ω-shaped stiffener is an example stiffener that is closed along its sides and with the skin 11 determines a hollow volume 14. There are also stiffeners which determine an open hollow volume, for example stiffeners with a C-shaped profile, which, as will be appreciated from the following description, will also advantageously be considered as closed stiffeners with regard to the problem these stiffeners present in implementing the method.

The skin and each stiffener constitute that many subassemblies of the stiffened panel which are assembled in the panel produced.

Figure 2:
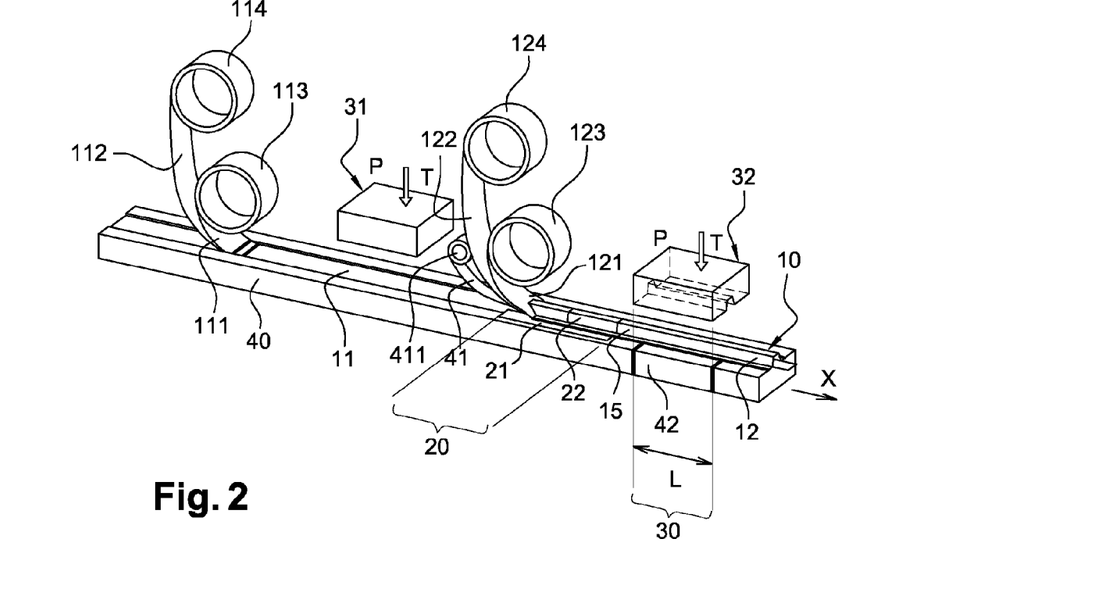
FIG. 2: an illustration of the method of the invention in a simplified form comprising a closed stiffener.

FIG. 2 illustrates the principle of the method of producing a part made of composite material according to the invention, using a simplified form of panel 10 with a relatively narrow skin, corresponding to a skin 11 of the panel, and just one stiffener 12 of the panel.

The method comprises:
- a first step of producing strips 111, 112, 121, 122 each consisting of stacked elementary plies;
- a second step of pulling the strips step by step through a die 20 for shaping said strips and for positioning the subassemblies relative to one another;
- a third step of compressing and heating the strips, as they leave the die 20 in each step, using a heating press 30.

During the first step of producing the strips 111, 112, 121, 122, each strip is produced by stacking in layers elementary plies, generally plies of unidirectional fibers impregnated with a non-hardened, i.e., nonpolymerized, thermosetting organic resin. This stack is produced in the conventional way as if to create parts made of composite materials.

More particularly, a strip comprises at least one ply comprising long fibers oriented in a longitudinal direction of the strip, i.e., the direction X in which the strip travels through the die 20, so that the strip can be pulled during implementation of the method without causing the strip to tear.

Each strip is advantageously produced with a width corresponding to the developed width of the subassembly for which it is intended. Thus, in general, the strips intended to form the skin have a greater width than the strips intended to form the stiffeners.

Furthermore, the plies are split between the strips in such a way that the stacking of the strips during implementation of the method leads to the desired number of plies for each subassembly of the part that is to be produced being obtained; in the example of FIG. 1, the plies of the skin 11 are split between the strips 111 and 112 and the plies of the stiffener 12 are split between the strips 121 and 122.

In the example of FIG. 1, the strips 111, 112 of the skin 11 are assembled separately from the strips 121, 122 of the stiffener 12, although said strips of the skin and of the stiffener may equally be assembled simultaneously.

In one advantageous implementation of the method, the strips are produced separately with the desired width and are packaged in rolls 113, 114, 123, 124 placed on racks to pay out the strips as they gradually pass through the die 20.

This packaging in rolls is performed in the same way as for plies on lay-up machines known to those skilled in the art, using, in the case of tacky materials, a separating film, and in this instance the length, and therefore the size of the rolls, is tailored to meet the need to produce the stiffened panels continuously.

If necessary, rolls prepared in advance are stored at low temperature in order to slow the polymerization of the prepreg resin until such time as they are used.

During the second step, the strips 111, 112, 121, 122 are pulled on a first part 40 of a mold through the die 20.

Figure 7:
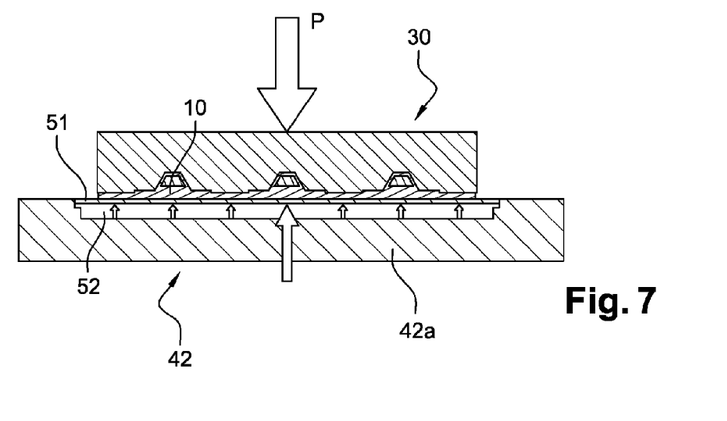
FIG. 7: a cross section, perpendicular to the direction in which the preform travels through the die, at the press and comprising a plate with an elastic deformable element.

The die 20 itself comprises secondary dies 21, 22 the shapes of which in each case correspond to a profile of a subassembly, skin or stiffener, of the part that is to be formed, in the example illustrated a first secondary die 21 the profile of which is that of the skin 11 and a second secondary die 22 the profile of which is that of the stiffener 12. The secondary dies are arranged relative to one another so that on leaving the die 20, the stiffener 12 is positioned on the skin 11 at the desired location for obtaining the part 10. The interior profile of the hollow stiffeners on the skin is provided by a secondary shaping system which may for example be a needle 23 having a cross section corresponding to the internal cross section of the stiffener, as illustrated in FIG. 7 which is a cross section transverse to the direction X of pulling on the preform in the region of the heating press 30.

The strips 111, 112, 121, 122 are pulled through the die 20 by a pulling device, not depicted, for example a device having rollers or tracks, situated on the downstream side of the die 20 and of the press 30, the downstream side being the opposite side to the side via which the strips enter said die, the movement here being in steps of length dL.

This pulling which drives the strips through the die 20 is rendered possible without the plies deforming, and in particular without appreciably altering the orientation of the fibers or causing them to break because of the fact that at least one ply of each strip comprises fibers oriented longitudinally and able to transmit load in the direction X of pulling.

On leaving the die 20, the strips 111, 112, 121, 122 which are assembled constitute a preform 15 of the part 10 which is subjected, at a press 30, during a third, hardening, step, preferably as close as possible to the die 20, to a pressure P and to a heating to a temperature T over a press length L in the direction of travel through the die 20.

The press length L is in practice small in comparison with a length of the stiffened panel to be produced, for example less than one meter whereas the panel produced is theoretically unlimited in its length and may in practice exceed ten meters long.

Said pressure P and said heating to the temperature T are applied for a duration dt during which the preform 15 is immobilized between two successive translational movements through the die, i.e., between two steps of length dL, dL being less than L, so that a portion of the part will, at the end of this second step, have been subjected to the pressure P and to the temperature T for the cumulative duration $T = dt \times (L/dL)$ of immobilization of the L/dL steps needed for a point on the preform to have covered the distance L.

This time is therefore defined by the parameters chosen for implementing the method and is dictated by the polymerization cycle for the resin used. Although it may vary widely, the mean speed at which the preform is fed through the die 20 is generally a few centimeters per minute for the thermosetting resins most often used in the aeronautical industry.

The length dL has to be shorter than the press length L in order to guarantee that the entire length of panel will be subjected to the pressure P and to the temperature T. In practice, dL will be less than ⅓ of the press length L, for example 1/10 of the length L or less, in order to allow the resin to harden gradually and uniformly.

The application of the pressure P makes it possible to calibrate and stabilize the preforms leaving the die and compress the various plies of the strips together in order to obtain the desired healthiness of composite material having passed through the press 30.

The application of the temperature T allows the resin to reach a desired level of polymerization, which may be full polymerization or partial polymerization, the number of dL steps to cover the press length L and the duration for which the pressure P and temperature T are maintained being chosen to obtain a time for which the temperature T is applied that corresponds to the conditions required to obtain this result.

During this phase of applying the temperature T and pressure P the various strips, the skin and the stiffeners, subjected to cocuring, are assembled during the polymerization, which polymerization is, depending on the circumstances, either partial or full as already specified.

If necessary, a tunnel furnace may be positioned downstream of the press 30 to carry out post-polymerization of the material in order to confer upon it the maximum of its desired mechanical properties.

The pressure P and the temperature T are, for example, applied by means of a heating press 30 formed by a second mold part 32 which compresses the preform 15 between said second mold part and the first mold part 40, more particularly a compression zone 42 of said first mold part situated facing said second mold part. Heating means regulate the temperature T of the heating press 30, the compression zone 42 advantageously being thermally insulated in order to prevent heat supplied by the heating press 30 from spreading into the rest of the first mold part 40.

In the example illustrated in FIG. 2, the pressure P is interrupted, or at least sufficiently reduced that it does not oppose the movement of the preform 15 and the passage of the strips through the die 20 during the pulling performed thereon or on the formed part of the stiffened panel, which pulling is for example carried out by opening the heating press 30, i.e., by moving the second mold part 32 away from the compression zone 42, these two parts of the heating press being fixed in the direction X of pulling and or travel of the part 10.

In another embodiment which has not been depicted, the heating press 30 is mounted on a follower device which accompanies the movement of the preform as it is being pulled, or which even drives the preform held by the pressure P exerted, over the distance dL while maintaining the pressure P and the temperature T and then, when said distance dL has been covered, the pressure is released and the follower device is returned upstream then the pressure P is applied once again for a further follower cycle. With such a device, the length of the steps dL can be any, less than or equal to the length L, or may even correspond to near-continuous driving of the part.

In these two embodiments, the pressure P is released during the movements of relative translation between the heating press 30 and the preform 15.

The pressure P applied during the third step needs to be applied as uniformly as possible to all the surfaces of the strips shaped by the die 20 including the surfaces corresponding to the stiffeners, particularly the side walls of the webs of the stiffeners.

In order to apply the pressure P, the means implemented are advantageously optimized according to whether the stiffener is an open profile that allows the stiffener to be demolded when the heating press 30 is opened or whether the stiffener is a closed profile that does not allow this type of demolding.

Figure 3:
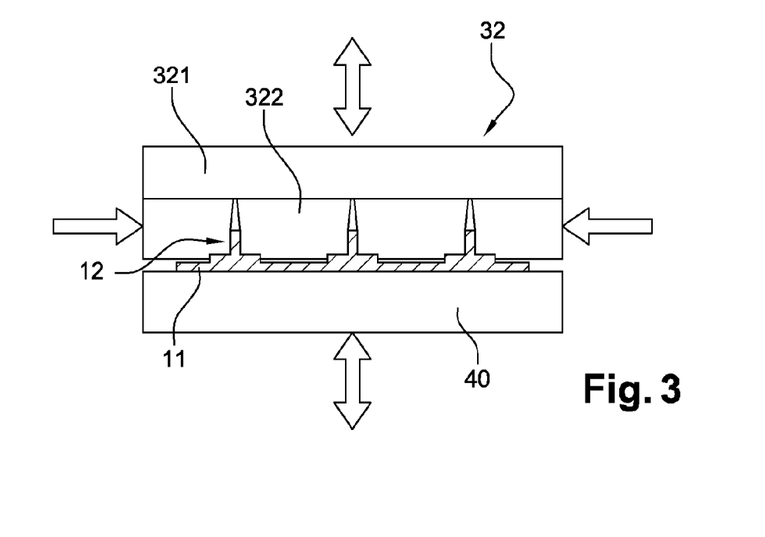
FIG. 3: a view from end of the heating press closed down onto a panel made of composite material with an open stiffener.

In the case of the panel 10 of FIG. 1a with T-shaped stiffeners 12, the second part of the mold 32 comprises lateral pressing elements 322 secured to a base 321, as illustrated in FIG. 3.

The lateral pressing elements 322 are dimensioned and arranged such that they are positioned between two webs 132 of stiffeners or on one side of the web of a lateral stiffener of the panel and said lateral pressing elements are secured to the base 321 in such a way that they can be brought together under the effect of forces applied laterally to the outermost lateral pressing elements.

Thus, when the pressure P is applied during the third step of the method by moving the second part of the mold 32 and the compression zone 42 closer together, the lateral force is applied at the same time so that the webs 132 of the stiffeners are likewise compressed.

In the case of the panel 10 of FIG. 1b with closed stiffeners 12, in this instance of Ω-shaped cross section, it is not possible to use only the lateral pressing elements of the second mold element 32 and it then becomes necessary to use a rigid polymerization core, such as a metallic needle for example, intended to occupy the hollow volume 14 between the skin 11 and a stiffener 12 in order to be able to apply sufficient pressure to the webs 134 and the head 135 of the Ω-shaped stiffener. Such a rigid core therefore extends in the direction X from the die 20 into the heating press 30.

Figure 4:
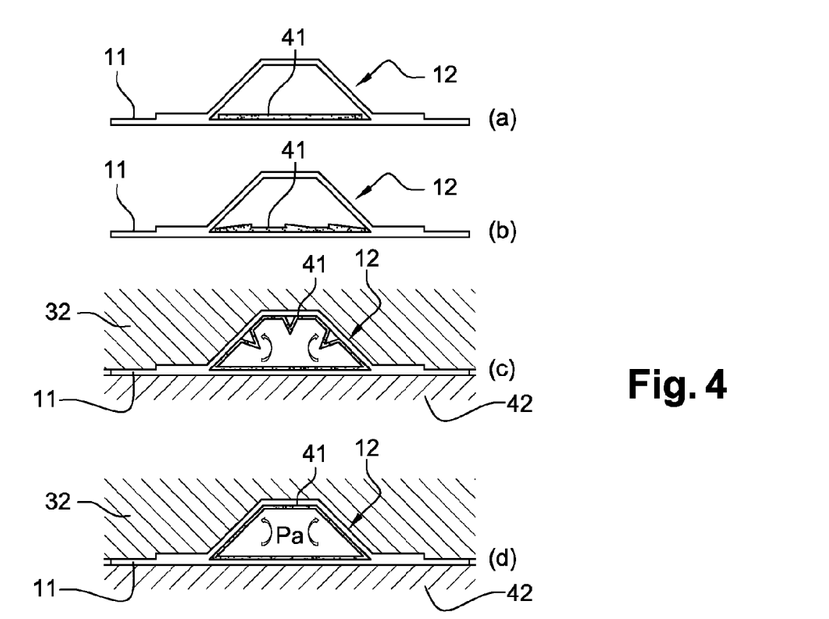
FIG. 4: a sequence, views a, b, c, d, of the opening of a molding core introduced between the preforms of the skin and of the stiffeners.
Figure 5:
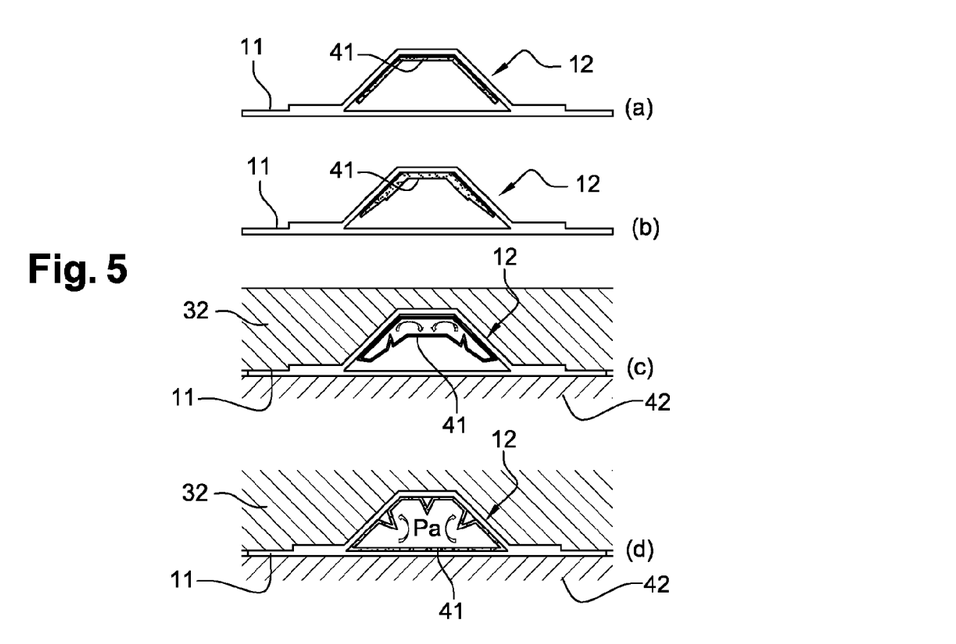
FIG. 5: a sequence, views a, b, c, d, of the opening of a molding core.

In an embodiment of a polymerization core intended to occupy the hollow volume 14, a flexible and inflatable bladder 41, for example a bladder made of polyimide, of Teflon® or of silicone, is placed in said hollow volume and is subjected to an inflation pressure Pa, for example the pressure of the autoclave or an equivalent pressure, so that the bladder 41 presses against interior faces of the hollow volume 14, see FIG. 4d and FIG. 5d, both on the skin 11 and on the stiffener 12, this having the effect of compressing the plies against the compression zone 42 and against the second mold part 32, with the known effects beneficial to the health of the material.

One option afforded by the use of such an inflatable polymerization core during the third step of applying the pressure P using the heating press 30 is that of creating stiffeners 12 of variable thickness.

In such cases, the exterior shape is dictated by the die and the second mold part 32 and the inflatable polymerization core adapts to the shape of the cross section of the hollow volume 14 resulting from the exterior shape and from the thicknesses of the stiffener.

Use of the bladder 41 may also be combined with use of a rigid polymerization core such as a metallic needle when the resin of the panel is only partially polymerized when it leaves the heating press 30 (part-cured state).

In that case, the bladder 41 is not necessarily inflated during the creation of the stiffened panel 10 according to the method and is kept inside the hollow volume 14 so that it can be inflated in a later, final polymerization, step in order to stabilize the stiffener for example after an operation of bending the panel and/or of assembling panels during which step the panel is subjected to an autoclave pressure which could, were the pressures obtained not equalized by the bladder, cause the stiffener to deform before the resin has reached a sufficient stage of polymerization to provide sufficient rigidity.

This embodiment is also applicable to stiffeners comprising open hollow volumes that do not allow simple demolding, such as the case of stiffeners with C-shaped profiles for example.

In one application of the method of the invention, the bladder is formed of a tube introduced into the die 20 in the same way as the strips 111, 112, 121, 122.

In order to have access to long lengths of bladder and ensure continuous production of the stiffened panel, as illustrated in FIG. 1, the bladder 41 is delivered in the form of a tape placed on a reel 411 in which the tube is flattened.

The bladder 41 is introduced, for example flattened, into the die 20 by being placed on the strips that form the skin 11 and fills the volume of the hollow shape according to the sequence (a), (b), (c), (d) illustrated in FIG. 4 by being inflated after it has passed through the die 20.

It may be pointed out that the uninflated bladder 41 is flattened by making a gusset with the wall of the tube forming said bladder so that in the flattened form, the width of the tape formed by the bladder lies on the skin with a width which is less than or at the most equal to the interior width of the hollow volume and therefore does not become sandwiched between the soles 133 of the stiffener and the skin 11.

The flattened bladder 41 may also be introduced into the die 20 placed under the strips forming the stiffener 12 and fills the volume of the hollow shape according to the sequence (a), (b), (c), (d) illustrated in FIG. 5 by being inflated after having passed through the die 20.

The pressure Pa used for inflating the bladder 41 is introduced via a free end of the bladder 41 situated downstream, in the direction X of pulling on the panel, of the stiffened panel 10 in the process of being produced, for example using pressurized air, the inflation of the bladder being limited on the upstream side by the die 20 which keeps the walls of the tube of which the bladder 41 is formed squeezed together.

In this embodiment, it is necessary for the pressure exerted by the bladder 41 once inflated not to cause the stiffener 12 to separate from the skin 11 or cause unacceptable deformation of the one or of the other.

In order to avoid the risk of such separation or deformation, on the one hand, the pressure Pa in the bladder 41 is introduced and maintained only while the pressure P of the heating press is being applied, the pressure Pa therefore being created in the bladder 41 in step with and according to the cyclic application of the pressure P by the heating press 30 and, on the other hand, the level of polymerization reached when the part 10 leaves the heating press 30 is sufficiently high that it ensures that the stiffener 12 adheres to the skin 11 and that the walls delimiting the hollow volume 14 gain sufficient rigidity.

When the panel that is in the process of being produced is finished, the pressure in the bladder 41 is canceled and the deflated polymerization core can, if appropriate, be extracted by pulling from one of the ends of the panel 10.

In another embodiment which has not been illustrated, the hollow volume 14 is occupied by a rigid core, such as a needle 23 for example, fixed at the region of the die 20 and extending substantially as far as the most downstream part, in the direction X of pulling on the panel, of the heating press 30, so that the pressure P exerted by said heating press also generates pressure on the walls delimiting the hollow volume 14 and held by the rigid core.

The method which has just been described for the particular case of a flat stiffened panel may be generalized without difficulty to cover any structural element made of composite material.

Figure 6:
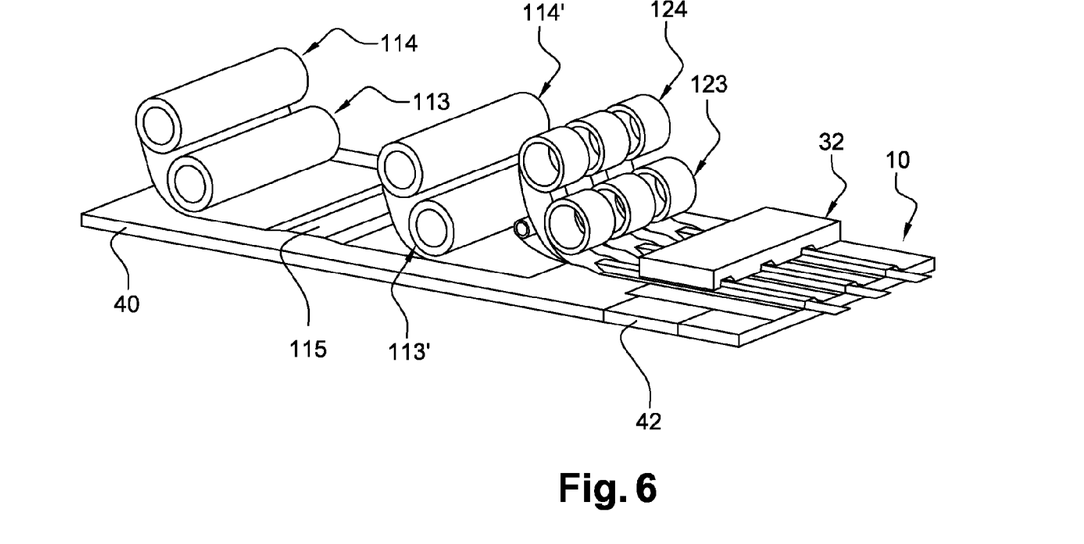
FIG. 6: an illustration of the method of the invention for an example of flat panel comprising three closed stiffeners and one local reinforcement.

FIG. 6 illustrates an example of a flat panel in the process of being produced and comprising three Ω-shaped stiffeners.

In this illustration, the parts of the die 20 have not been depicted.

In the device illustrated in FIG. 6, the skin is produced using four strips paid out from rolls 113, 114, 113', 114' and each stiffener is produced from two strips 123, 124.

In this case, the rack is designed to hold all the rolls used.

A panel may also exhibit local variations in thickness, particularly of the skin.

The variations in thickness in the composite materials generally consist of a local alteration to the number of plies used to form a wall of the part.

When such a variation in thickness is constant over the entire length of the skin, which is a scenario that has not been illustrated, the corresponding plies are placed on one or more additional strips of width narrower than the width of the skin and the shape of the first secondary die 21 is adapted to account for the difference in thickness.

When such a variation in the thickness is localized to part of the length of the panel, strips 115, as illustrated in FIG. 6, comprising the desired number of plies, are deposited either directly onto or between the plies during the preparation of the strips or on demand when the strips are used, for example by hand or by means of a lay-up machine 31 that applies the desired plies prior to entry into the die 20.

When the preform has such local additional thicknesses in the region of a stiffener and the part is polymerized to a finished state on the leaving of the part, said local additional thicknesses are pushed back toward the inside of the hollow volume 14 of the panel 10, between the skin 11 and the stiffener 12, under the effect of the press 30. The ability of the inflated bladder 41 to deform therefore allows the additional local thicknesses to be absorbed. The result of this process of shaping using the press is that the external faces, particularly the outer face of the panel produced, is free of local deformations.

When the part is polymerized to a part-cured state upon the leaving of the press with a view to a forming or assembly operation during a final polymerization in an autoclave, the additional thicknesses are advantageously pushed back during the forming in the autoclave to obtain an exterior face that conforms to the surface of the mold used.

In order to guarantee application of a correct pressure P to the preform 15, which is a condition of correct compression and correct shaping of the part, the heating press 30 is advantageously produced in such a way as to accept the differences in thickness of the compressed material, for example by producing at least one of the mold parts with an elastically deformable element 52 that has a suitable softness, such as an elastomeric material or an inflatable flexible membrane as illustrated in FIG. 7.

In the example illustrated in FIG. 7, the compression zone 42 comprises, between a base 42a of said compression zone and the part 10, here in the preform state, the deformable element 52 which comes to bear firstly against the base 42a and secondly against a semirigid intermediate plate 51 interposed between the part 10 and the deformable element 52.

When the pressure P is applied to the heating press 30, the deformable element 52 deforms under the reaction of the base 42a and of the variations in thickness of the material caused by local additional thicknesses of the compressed part, which variations in thickness are transmitted by the intermediate plate 51.

The semirigid intermediate plate 51 firstly ensures better spreading of the load introduced by the differences in thickness in the material of the part, makes it easier for the part 10 to slide in the heating press 30 when the part is moved in the direction X of pulling, protects the material of the deformable element which is, for example, a silicone, and makes it possible to obtain a better surface finish of the part 10 on its face facing toward the base 42a.

Although the skin 11 of the panel has been depicted as flat in the examples illustrating the method, a plunged groove 16 is advantageously produced along one edge of the panel, as in the case of the panels illustrated in FIGS. 1a and 1b, by a suitable configuring of the die 20 and of the heating press 30. Such a plunged groove is, for example, provided so that the panels can be assembled with one another flush without discontinuity along one of the faces of the assembled panels.

The panel obtained may also have a simple curvature imparted by a corresponding shape of the die and of the heating press, or may even be bent lengthwise by a suitable shape of the heating press and pulling means.

In one embodiment of the method, the resin of the preform is only partially polymerized during the third step of the method so that a plastic state can be regained when the temperature is raised again.

In this case, the panel in a precured state may be shaped once again in a mold, for example to acquire a double curvature, undergo pressing operations or other localized treatments, be assembled by cocuring with other panels or subassemblies made of materials in the fresh state or in the partially polymerized state during an additional step in which the panel has its temperature raised, is shaped when the resin has reached a plastic state, and then held at temperature, for example in an autoclave, until the resin has fully polymerized.

One application example relates to the creation of aircraft fuselages in which stiffened fuselage panels are produced according to the method as far as a precured state and then assembled during the final polymerization step with, for example, doorframes or window frames or fuselage frames which may be made of metallic materials or of composite materials which are uncured or partially or fully cured.

Figure 8:
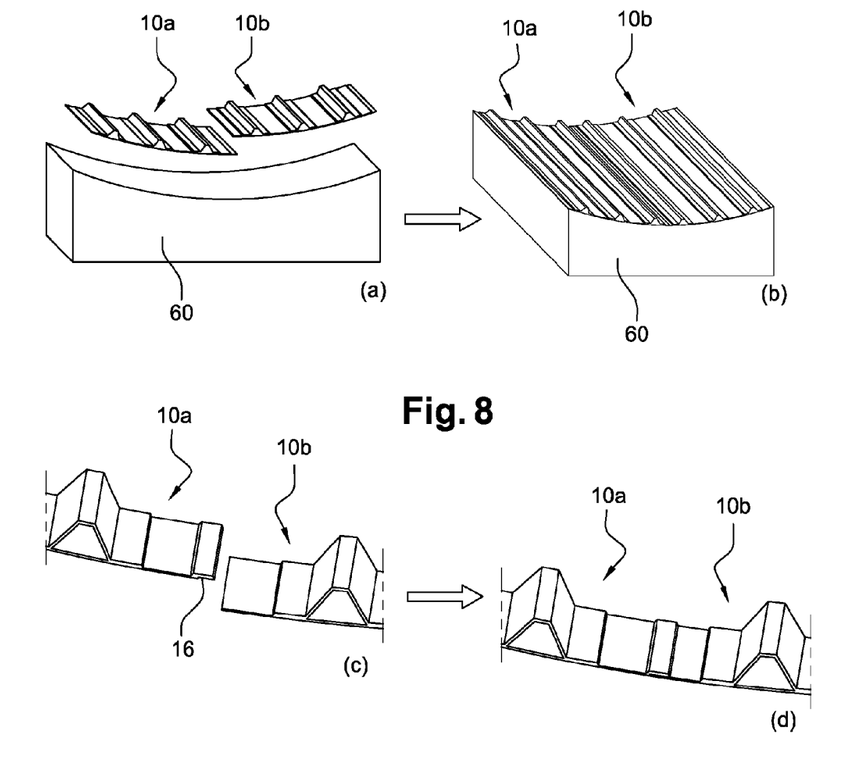
FIG. 8: an illustration of the assembly by cocuring of two panels in a mold (views a and b) and detail of the region of the join between panels (views c and d).

The special case of the assembling of two panels 10a, 10b is illustrated in FIG. 8. The two panels are thus positioned, view a and detail c of FIG. 8, on a molding die 60 of a mold having the desired shape for the assembly, with a double curvature as appropriate, then the assembly comprising the molding die 60 and the parts 10a, 10b, view b and detail d of FIG. 8, is put into an autoclave, not depicted, so that the two panels can be polymerized with cocuring.

The method and the device therefore make it possible to produce, continuously, stiffened panels and, more generally, any type of part made of composite material that can be likened to a stiffened panel, using means, particularly a heating press, of reduced size irrespective of the length of the parts that are to be produced.

Depending on the chosen state of polymerization of the material, in a subsequent step these panels may be shaped and assembled with other panels or subassemblies during a final polymerization, for example to produce aircraft fuselages.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for producing a part made of composite material, said part comprising a skin and at least one stiffener joined to said skin, said skin being formed from at least one first strip and said at least one stiffener being formed from at least one second strip, each first and second strip being formed by at least one ply of fibers impregnated with a non-polymerized resin, said method comprising the steps of:
    producing a preform of the part by pulling the at least one first strip and the at least one second strip in a longitudinal direction X through a die for shaping and positioning the skin and the at least one stiffener, at least one first and at least one second strips being placed in contact, and a polymerization core being introduced between a first strip and a second strip in contact before their passage through the die; and
    pressing the preform obtained in a heating press for a duration dt so as to form the skin and the at least one stiffener joined to the skin, a pressure P and a temperature T for polymerizing the resin of the first and second strips being applied to said preform in said heating press over a press length L, the press length L being considered in the longitudinal direction X of the preform and being shorter than a length of the panel;
    wherein said polymerization core is inflatable;
    wherein a part of said core situated in the press is inflated with a pressure Pa greater than atmospheric pressure when the pressure P is applied to the preform.

2. The method as claimed in claim 1, wherein said at least one first strip and/or said at least one second strip comprises at least one ply comprising long fibers oriented in the longitudinal direction X.

3. The method as claimed in claim 1, further comprising a step, prior to the production of the preform, of deposition, upstream of the die, of one or more reinforcing plies locally on at least one of the at least one first and the at least one second strip.

4. A device for producing parts made of composite material, wherein the part comprises a skin and at least one stiffener joined to said skin, said skin being formed from at least one first strip and said at least one stiffener being formed from at least one second strip, each first and second strip being formed by at least one ply of fibers impregnated with a non-polymerized resin, the device comprising:
    a die for shaping and positioning the at least one first and at least one second strips to produce a preform;
    a heating press arranged to receive the preform and to apply a pressure P and for generate a temperature T, the heating press being placed downstream of the die in a direction X of travel of the parts to be produced;
    a pulling device being configured to move the at least one first and at least one second strips in the die from upstream to downstream in a direction X of travel of the parts to be produced; and
    a device for dispensing at least one polymerization core being configured to dispense said at least one polymerization core between the at least one first and at least one second strip upstream of the die;
    wherein the device for dispensing at least one polymerization core is configured to dispense at least one inflatable polymerization core; and wherein the device for producing parts made of composite material further comprises:
    a system for inflating said at least one inflatable polymerization core, said inflation system being slaved to the heating press and configured to inflate said polymerization core when the pressure P is exerted on the preform.

5. The device as claimed in claim 4, wherein a plate of the heating press comprises an elastically deformable element in an area of application of the pressure P to the preform.

6. The device as claimed in claim 5, wherein the elastically deformable element comprises one of a block of elastomer and an inflatable membrane.

7. The device as claimed in claim 4, wherein the die comprises a first secondary die for the skin and a second secondary die for each at least one stiffener.

8. The device as claimed in claim 4, wherein the pulling device is a device with at least one of rollers and tracks.

9. The device as claimed in claim 4, wherein the pulling device is a device with translation of the heating press.

* * * * *